US 11,307,975 B2

(12) United States Patent
Mo et al.

(10) Patent No.: US 11,307,975 B2
(45) Date of Patent: Apr. 19, 2022

(54) MACHINE CODE ANALYSIS FOR IDENTIFYING SOFTWARE DEFECTS

(71) Applicant: INTERNATIONAL BUSINESS MACHINES CORPORATION, Armonk, NY (US)

(72) Inventors: Brian Mo, Rego Park, NY (US); Andrew C. M. Hicks, Wappingers Falls, NY (US); Ryan Thomas Rawlins, New Paltz, NY (US); Dale E. Blue, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/795,969

(22) Filed: Feb. 20, 2020

(65) Prior Publication Data
US 2021/0263841 A1    Aug. 26, 2021

(51) Int. Cl.
G06F 11/36    (2006.01)
G06N 20/00    (2019.01)
G06N 5/04    (2006.01)

(52) U.S. Cl.
CPC ...... G06F 11/3692 (2013.01); G06F 11/3684 (2013.01); G06F 11/3688 (2013.01); G06N 5/04 (2013.01); G06N 20/00 (2019.01)

(58) Field of Classification Search
CPC ............. G06F 11/3692; G06F 11/3684; G06F 11/3688; G06N 20/00; G06N 5/04
See application file for complete search history.

(56) References Cited

U.S. PATENT DOCUMENTS

| 5,860,008 | A  | * | 1/1999 | Bradley | G06F 8/53 |
| | | | | | 717/137 |
| 5,907,834 | A  |   | 5/1999 | Kephart | |
| 6,934,656 | B2 |   | 8/2005 | Norman | |
| 7,024,589 | B2 |   | 4/2006 | Hartman | |
| 7,519,997 | B2 |   | 4/2009 | Shipp | |
| 7,761,825 | B2 |   | 7/2010 | Chadha | |

(Continued)

FOREIGN PATENT DOCUMENTS

WO    1999015966 A1    4/1999

OTHER PUBLICATIONS

Danielle Gonzalez et al., "A Large-Scale Study on the Usage of Testing Patterns that Address Maintainability Attributes", [Online], pp. 1-11, [Retrieved from Internet on Feb. 12, 2022], <https://arxiv.org/pdf/1704.08412.pdf> (Year: 2017).*

(Continued)

*Primary Examiner* — Ziaul A Chowdhury
(74) *Attorney, Agent, or Firm* — Cantor Colburn LLP; Teddi Maranzano

(57) ABSTRACT

According to one or more embodiments of the present invention, a computer-implemented method for machine code analysis includes executing a set of test cases associated with a software product. The method further includes determining a failing test case, from the set of test cases. The method further includes identifying a portion of a machine code of the software product, the portion of the machine code corresponding to the failing test case. The method further includes analyzing the portion of the machine code to identify a pattern of machine code causing the failing test case to fail. The method further includes searching the machine code of the software product to find the identified pattern of machine code.

15 Claims, 3 Drawing Sheets

(56) References Cited

U.S. PATENT DOCUMENTS

| | | |
|---|---|---|
| 8,132,056 B2 | 3/2012 | Thakkar |
| 8,151,248 B1 | 4/2012 | Butler et al. |
| 8,255,861 B2 | 8/2012 | Bhinge |
| 8,386,851 B2 | 2/2013 | Ur |
| 8,561,036 B1 | 10/2013 | Beans et al. |
| 8,904,536 B2 | 12/2014 | Breitenbacher |
| 8,972,785 B2 | 3/2015 | Kahne |
| 9,002,197 B2 | 4/2015 | Dahlfort |
| 9,003,222 B2 | 4/2015 | Bharmidipaty |
| 9,026,855 B2 | 5/2015 | Sharma |
| 9,043,761 B2 | 5/2015 | Artzi |
| 9,106,548 B2 | 8/2015 | Johnsson |
| 9,178,755 B2 | 11/2015 | Dahlfort |
| 9,305,165 B2 | 4/2016 | Snow |
| 9,317,401 B2 | 4/2016 | Bartley |
| 9,489,289 B2 | 11/2016 | Hu |
| 9,569,345 B2 | 2/2017 | Friedler |
| 9,733,907 B2 | 8/2017 | Goetz |
| 10,050,993 B2 | 8/2018 | Johri |
| 10,073,763 B1* | 9/2018 | Raman ............... G06F 11/3688 |
| 10,083,191 B2 | 9/2018 | Barbas |
| 10,235,277 B2 | 3/2019 | Herzig et al. |
| 10,831,645 B1 | 11/2020 | McNeil et al. |
| 2003/0070119 A1 | 4/2003 | Dallin |
| 2006/0085132 A1 | 4/2006 | Sharma et al. |
| 2007/0094189 A1 | 4/2007 | Yamamoto et al. |
| 2008/0256404 A1 | 10/2008 | Funatsu |
| 2009/0265694 A1 | 10/2009 | Bakowski |
| 2009/0292956 A1 | 11/2009 | Rivera |
| 2011/0066490 A1 | 3/2011 | Bassin et al. |
| 2012/0089964 A1 | 4/2012 | Sawano |
| 2013/0041613 A1 | 2/2013 | Bhide et al. |
| 2013/0047140 A1* | 2/2013 | Shann ............... G06F 11/3612 |
| | | 717/128 |
| 2013/0055014 A1 | 2/2013 | Kang |
| 2013/0061104 A1 | 3/2013 | Hartl |
| 2013/0013244 A1 | 10/2013 | Kristiansen |
| 2013/0318503 A1* | 11/2013 | Li ............... G06F 9/45529 |
| | | 717/126 |
| 2014/0351793 A1 | 11/2014 | Bartley et al. |
| 2014/0355453 A1 | 12/2014 | Zhang |
| 2015/0081389 A1 | 3/2015 | Dereszynski et al. |
| 2016/0034375 A1 | 2/2016 | Sinha et al. |
| 2016/0170972 A1 | 6/2016 | Andrejko |
| 2016/0378647 A1 | 12/2016 | Maeoka et al. |
| 2017/0068612 A1 | 3/2017 | Herzig et al. |
| 2017/0083432 A1 | 3/2017 | Dhulipala |
| 2017/0103013 A1 | 4/2017 | Grechanik |
| 2018/0101467 A1 | 4/2018 | Hisagi |
| 2018/0121332 A1 | 5/2018 | Andrejko |
| 2018/0189168 A1* | 7/2018 | Dwarakanath ....... G06F 11/3684 |
| 2018/0267102 A1 | 9/2018 | Douskey |
| 2018/0276108 A1 | 9/2018 | Park |
| 2018/0307583 A1 | 10/2018 | Yang et al. |
| 2018/0351788 A1 | 12/2018 | Tammana |
| 2019/0018753 A1 | 1/2019 | Saha |
| 2019/0034323 A1 | 1/2019 | M et al. |
| 2019/0079853 A1 | 3/2019 | Makkar |
| 2019/0087312 A1 | 3/2019 | Akbulut |
| 2019/0155722 A1* | 5/2019 | Gupta .................. G06F 11/008 |
| 2019/0196950 A1* | 6/2019 | Ranganathan ........ G06N 20/00 |
| 2019/0332523 A1 | 10/2019 | Gefen et al. |
| 2019/0340113 A1* | 11/2019 | Earanti ............... G06F 11/3664 |
| 2020/0285570 A1 | 9/2020 | Knaack et al. |
| 2020/0349062 A1 | 11/2020 | Coleman et al. |
| 2021/0042570 A1 | 2/2021 | Iskandar et al. |
| 2021/0064515 A1 | 3/2021 | Xu et al. |
| 2021/0263842 A1 | 8/2021 | Sekhar et al. |

OTHER PUBLICATIONS

David S. Rosenblum et al., "Predicting the Cost-Effectiveness of Regression Testing Strategies", [Online], pp. 118-126, [Retrieved from Internet on Feb. 12, 2022], <https://dl.acm.org/doi/pdf/10.1145/239098.239118>, (Year: 1996).*

Balakrishnan et al., "WYSINWYX: What you see is not what you eXecute," ACM Transactions on Programming Languages and Systems, vol. 32, No. 6, Article 23, Aug. 2010. 84 pages.

Blue et al., "Interaction-Based Test-Suite Minimization", Proceedings of the 35th International Conference on Software Engineering (ICSE), May 2013. pp. 182-191.

Christodorescu et al., "Static analysis of executables to detect malicious patterns," Proceedings of the 12th USENIX Security Symposium (Security'03), Aug. 4-8, 2003, pp. 169-186.

Gong et al., "JITProf: Pinpointing JIT-unfriendly JavaScript Code," Proceedings of the 2015 10th Joint Meeting on Foundations of Software Engineering (ESEC/FSE 2015). ACM, New York, NY, USA, pp. 357-368.

Herzig et al.; "Empirically Detecting False Test Alarms Using Association Rules", 2015 IEEE/ACM 37th IEEE International Conference on Software Engineering, May 2015. 10 pages.

Hicks et al., "Assignment of Test Case Priorities Based on Combinatorial Test Design Model Analysis," U.S. Appl. No. 16/795,963, filed Feb. 20, 2020.

Hicks et al., "Identifying False Positives in Test Case Failures Using Combinatorics," U.S. Appl. No. 16/795,966, filed Feb. 20, 2020.

Hicks et al., "Real Time Fault Localization Using Combinatorial Test Design Techniques and Test Case Priority Selection," U.S. Appl. No. 16/795,961, filed Feb. 20, 2020.

Itai Segall, "Combinatorial Test Design," IBM Haifa Research Labs, 2012. 49 pages.

Laghari et al., "Fine-Tuning Spectrum Based Fault Localisation with Frequent Method Item Sets," 31st IEEE/ACM International Conference on Automated Software Engineering (ASE 2016), DOI: 10.1145/2970276.2970308. Sep. 2016. pp. 274-285.

List of IBM Patents or Patent Applications Treated as Related; Date Filed: Mar. 10, 2020, 2 pages.

Noor et al.; "A Similarity-Based Approach for Test Case Prioritization Using Historical Failure Data", 2015 IEEE 26th International Symposium on Software Reliability Engineering (ISSRE), Nov. 2015. 11 pages.

Pearson et al., "Evaluating & improving fault localization techniques," 2017 IEEE/ACM 39th International Conference on Software Engineering (ICSE), DOI: 10.1109/ICSE.2017.62. Feb. 2017. 27 pages.

Rahman et al.; "Prioritizing Dissimilar Test Cases in Regression Testing Using Historical Failure Data", International Journal of Computer Applications: vol. 180, No. 14, Jan. 2018. 8 pages.

Roongruangsuwan et al., "Test Case Prioritization Techniques", Journal of Theoretical and Applied Information Technology, vol. 8, No. 2. pp. 45-60. Aug. 2010.

Segall et al., "Interactive Refinement of Combinatorial Test Plans," Proceedings of the 34th International Conference on Software Engineering (ICSE), Jun. 2012. pp. 1371-1374.

Tzoref-Brill et al., "Visualization of Combinatorial Models and Test Plans", Proceedings of the 31st IEEE/ACM International Conference on Automated Software Engineering, Sep. 2016. pp. 144-154.

Vangala et al.; "Test case Comparison and Clustering Using Program Profiles and Static Execution", Proceedings of the 7th joint meeting of the European Software Engineering Conference and the ACM SIGSOFT International Symposium on Foundations of Software Engineering, Aug. 24-28, 2009. 2 Pages.

Zheng et al.; "Locating Minimal Fault Interaction in Combinatorial Testing", Hindawi Publishing Corporation, vol. 2016, Article ID 2409521, pp. 1-10, Apr. 19, 2016.

Garcia-Molina, "Pair-Wise Entity Resolution: Overview and Challenges (Invited Talk)," Proceedings of the 15th ACM International Conferene on Information and Knowledgement Management, Nov. 2006, 1 page.

Zheng et al., "Locating Minimal Fault Interaction in Combinatorial Testing," Advances in Software Engineering, vol. 2016, Article ID 2409521, pp. 1-10.

Zhuang et al., "Representation Learing with Pair-wise Constraints for Collaborative Ranking," Proceedings of the Tenth ACM Inter-

(56) References Cited

OTHER PUBLICATIONS national Conference on Web Search and Data Mining, Feb. 2017, pp. 567-575.

* cited by examiner

MACHINE CODE ANALYSIS FOR IDENTIFYING SOFTWARE DEFECTS

BACKGROUND

The present invention relates generally to software testing, and more particularly, to machine code analysis for identifying software defects.

Software development and testing environments may implement a set of processes and programming tools to investigate a software product. Typically, users of software development, testing and production environments (e.g., software product developers) may use a program logs, crash reports, and debuggers to investigate the quality of a software program or application. Testing a software product during a development cycle may be challenging. The larger the software product, the more source code to be tested, and the more challenging the testing may become. A software failure may occur during testing due any number of things such as source code changes, requirement changes, and environment changes.

SUMMARY

According to one or more embodiments of the present invention, a computer-implemented method for machine code analysis includes executing a set of test cases associated with a software product. The method further includes determining a failing test case, from the set of test cases. The method further includes identifying a portion of a machine code of the software product, the portion of the machine code corresponding to the failing test case. The method further includes analyzing the portion of the machine code to identify a pattern of machine code causing the failing test case to fail. The method further includes searching the machine code of the software product to find the identified pattern of machine code.

According to one or more embodiments of the present invention, a system for machine code analysis, the system includes at least one processor, and at least one memory storing computer-executable instructions. At least one processor can access the memory and perform a method that includes executing a set of test cases associated with a software product. The method further includes determining a failing test case, from the set of test cases. The method further includes identifying a portion of a machine code of the software product, the portion of the machine code corresponding to the failing test case. The method further includes analyzing the portion of the machine code to identify a pattern of machine code causing the failing test case to fail. The method further includes searching the machine code of the software product to find the identified pattern of machine code.

According to one or more embodiments of the present invention, a computer program product for machine code analysis includes a storage medium readable by a processing circuit. The storage medium stores instructions executable by the processing circuit to cause a method to be performed. The method includes executing a set of test cases associated with a software product. The method further includes determining a failing test case, from the set of test cases. The method further includes identifying a portion of a machine code of the software product, the portion of the machine code corresponding to the failing test case. The method further includes analyzing the portion of the machine code to identify a pattern of machine code causing the failing test case to fail. The method further includes searching the machine code of the software product to find the identified pattern of machine code.

Additional technical features and benefits are realized through the techniques of the present invention. Embodiments and aspects of the invention are described in detail herein and are considered a part of the claimed subject matter. For a better understanding, refer to the detailed description and to the drawings.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Figure 1:
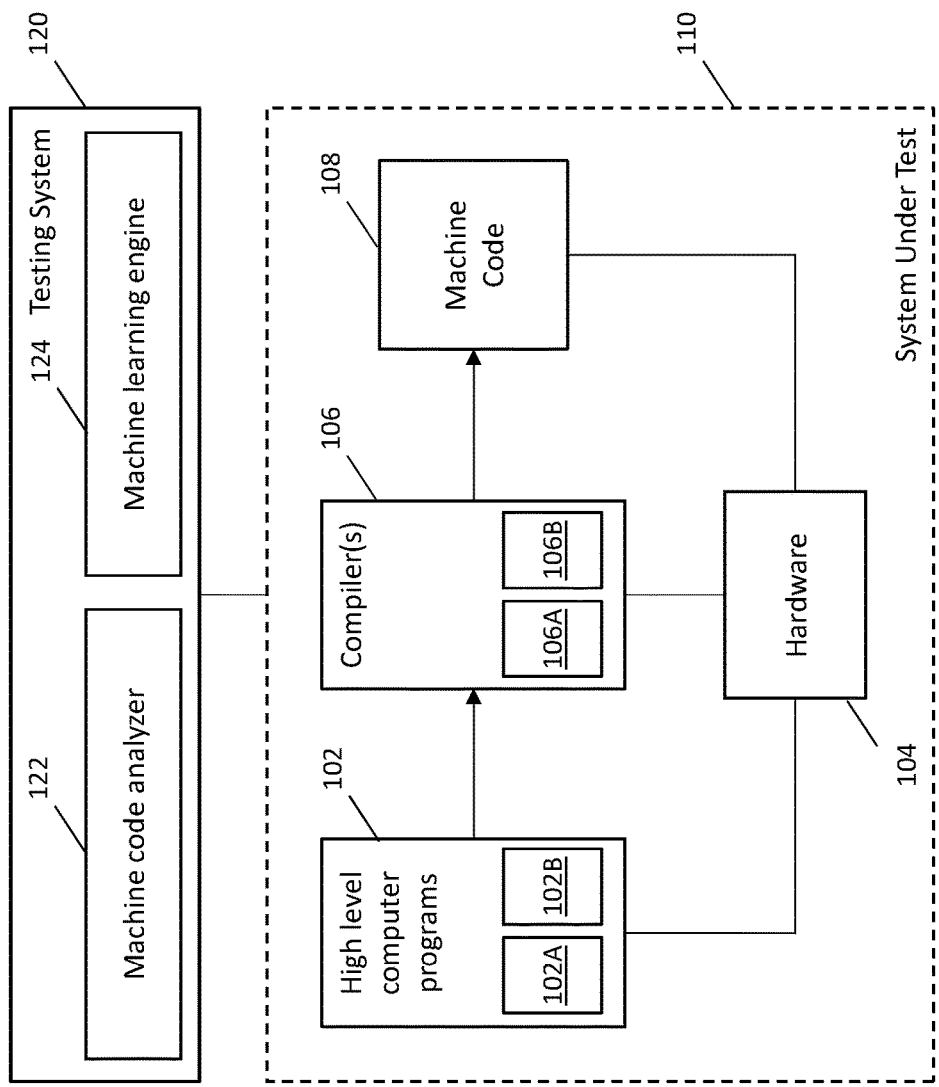
FIG. 1 is a schematic block diagram illustrating a system to analyze machine code in accordance with one or more example embodiments of the invention.

FIG. 1 illustrates a block diagram depicting a system for detecting software defects in a computer program according to one or more embodiments of the present invention. The depicted system 100 includes a testing system 120 that tests a system under test (SUT) 110. The SUT 110 includes a copy of the software product that includes one or more high level computer programs 102. Computer software is generally written by software developers in a high-level language which must be compiled into low-level machine code (also known as object code) in order to execute on a computer or other processor.

High-level computer languages use command wording that closely mirrors plain language, so they can be easily read by one skilled in the art. Typically, source code files have a suffix that identifies the corresponding language. For example, Java™ is a currently popular high-level language and its source code typically carries a name such as "prog1.java". Such files are generally referred to as ".java" files. Other examples include the high-level computer languages C and C++, where source files are typically ".c" or ".cpp" (for "C plus plus") files, respectively, as in "prog1.c" or "prog1.cpp", respectively.

The term "high-level structure" refers to, for example, the class hierarchy of object oriented programs such as those in Java™, or the module structure of module-based languages such as Ada™ and Modula-2™ programs. The SUT 110 includes one or more compilers 106 that compile the high level computer programs 102 into corresponding machine code 108. The compilers 106 can include multiple compilers 106A and 106B corresponding to different high level computer programming languages that are used by the developers to write the high level computer programs 102A and 102B respectively. For example, the high level computer programs 102 can include a first computer program 102A written in a first programming language and a second computer program 102B written in a second programming language. Accordingly, a first compiler 106A for the first programming language and a second compiler 106B are used to compile the respective programs into machine code 108. It is understood that in one or more embodiments of the present invention there can be different number of programming languages and compilers used. Further, the machine code 108 that is generated by the different compilers uses a common specification, which typically is specific to the hardware architecture of the hardware 104 of the SUT 110.

The term "machine code" generally refers to machine-executable code, which is the output of a software compiler 106 that translates source code in the high level computer program 102 from human-readable to machine-executable code. In the case of Java™, these files typically include bytecode and are commonly named "filename.class", where the "filename" may be any valid identifier string, and are referred to as ".class files". The term "low-level structure of machine code" refers to the actual details of how the program works, including scalar data flow and detailed control flow including inter-routine call-return linkages. Low-level analysis usually focuses on, or at least begins with, one routine at a time. This routine may be variously called, for example, a procedure, function or method; in C or C++ all routines are called "functions", whereas in Java™, they are all called "methods". The conventions vary with the source high-level software language. Analysis of individual routines may be followed by analyses of wider scope in some compilation tool sets.

The compiler 106 generates the machine code 108 specific to an architecture of the hardware 104 of the SUT 110 that executes the machine code 108. For example, the machine code 108 may specify particular hardware resources, such as registers, cache memory lines, logic units, arithmetic units, graphic processors, power supply resources, or other such hardware components to be used for executing the machine code 108. It should be noted that the compiler can optimize the machine code 108 that is generated specifically to the hardware 104 that will be used for execution. For embodiments of the present invention, an out of order execution of the machine code 108 is prevented, for example using a flag or any other indicator to the compiler 106.

It should be noted that the high level computer programs 102, the compilers 106, and the machine code 108, are all shown to be part of the SUT 110 in FIG. 1. In one or more embodiments of the present invention, the compilers 106 may generate the machine code 108 from the high level computer programs 102 on a separate machine that has the same hardware architecture as the SUT 110. The machine code 108 is then executed on the SUT 110, for example, by making a copy of the machine code 108 from that (second) separate machine.

The testing system 120 detects one or more software defects in the software product when it is executing on the SUT 110. Generally, software defects in different sections of source code across different modules are often caused by similar logic errors. These logic errors typically exist in the high level computer program 102. Typically unit tests, function tests, or other types of tests are generated to test the logic in the high level computer programs 102. However, a technical problem exists where the machine code 108 that is generated may cause a software defect because of the way the hardware resources are used during execution of the machine code 108. For example, the defect may be caused because of a particular sequence in which the hardware resources are used/exercised by the machine code 108.

One or more embodiments of the present invention address such technical challenges and relate to, among other things, devices, systems, methods, computer-readable media, techniques, and methodologies for automatically detecting fault logical constructs and fault paths within the machine code 108. According to one or more embodiments of the present invention, during execution of a regression tests, the testing system 120 enables identification of source code paths traversed by the regression test and/or specific lines of source codes in the high level computer programs 102 that are encountered during execution of the regression tests. The regression test may be executed on the SUT. Further, embodiments of the present invention analyze the machine code 108 and leverage a variety of machine learning techniques to identify error-prone logic in the compiled code before any explicit forms of code quality validation (e.g. unit testing) are performed.

In one or more examples, the testing system 120 includes a machine code analyzer 122 that employs artificial intelligence and deep learning techniques to identify defects within the machine code 108. Embodiments of the present invention provide practical applications and improvements in computing technology. Embodiments of the present invention improve existing source code analysis tools by finding software defects within source code 102 based on the corresponding machine code 108 and generate fewer false positives. Further, as deep learning techniques can be trained continuously over time, the machine code analyzer 122 increases in accuracy of identifying software defects in the machine code 108 over time and can be customized for a particular software development organization or a particular technical domain.

In one or more embodiments of the present invention, when execution of a software test discovers an error in a portion of the high level computer program 102 of the software product under test, any future execution of the same code portion typically leads to the same error until the defect in the source code that caused the error is fixed by developers. It should be noted that the error in the source code often represents a logical error. It should be further noted that at least in some cases different portions of the high level program 102 can be represented by identical logical constructs when compiled into corresponding machine code 108. Embodiments of the present invention facilitate automatically determining similar patterns within the machine code 108 to enable identification of software defects in the high level computer program 102, and the SUT 110 in turn. In one or more embodiments of the present invention, information about the execution environment and runtime contexts is analyzed to label certain logical paths of execution within the machine code 108 as "faulty".

It should be noted that embodiments of the present invention do not contemplate out-of-order execution of machine code instructions. Accordingly, embodiments of the present invention facilitate machine code analysis to provide technical effects include that of finding defects having similar logical errors across different modules. In one or more embodiments of the present invention, the modules may be written in different high level programming languages. The technical effects provided by one or more embodiments of the present invention provide technical solutions over conventional software testing techniques which do not allow for identification of faulty constructs and faulty code paths across an entire software product, especially one that is developed using several high level computer programming languages. More specifically, example embodiments of the present invention enable resources, such as time and processor cycles, to be more effectively utilized by preventing critical system crashes that would require a restart of all processes.

Illustrative methods in accordance with example embodiments of the invention and corresponding data structures (e.g., program modules) and components for performing the methods will now be described. It should be noted that each operation of the method 200 depicted in FIG. 2, may be performed by one or more components depicted in FIG. 1 or FIG. 3, whose operation will be described in more detail hereinafter. In one or more embodiments of the present invention, program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
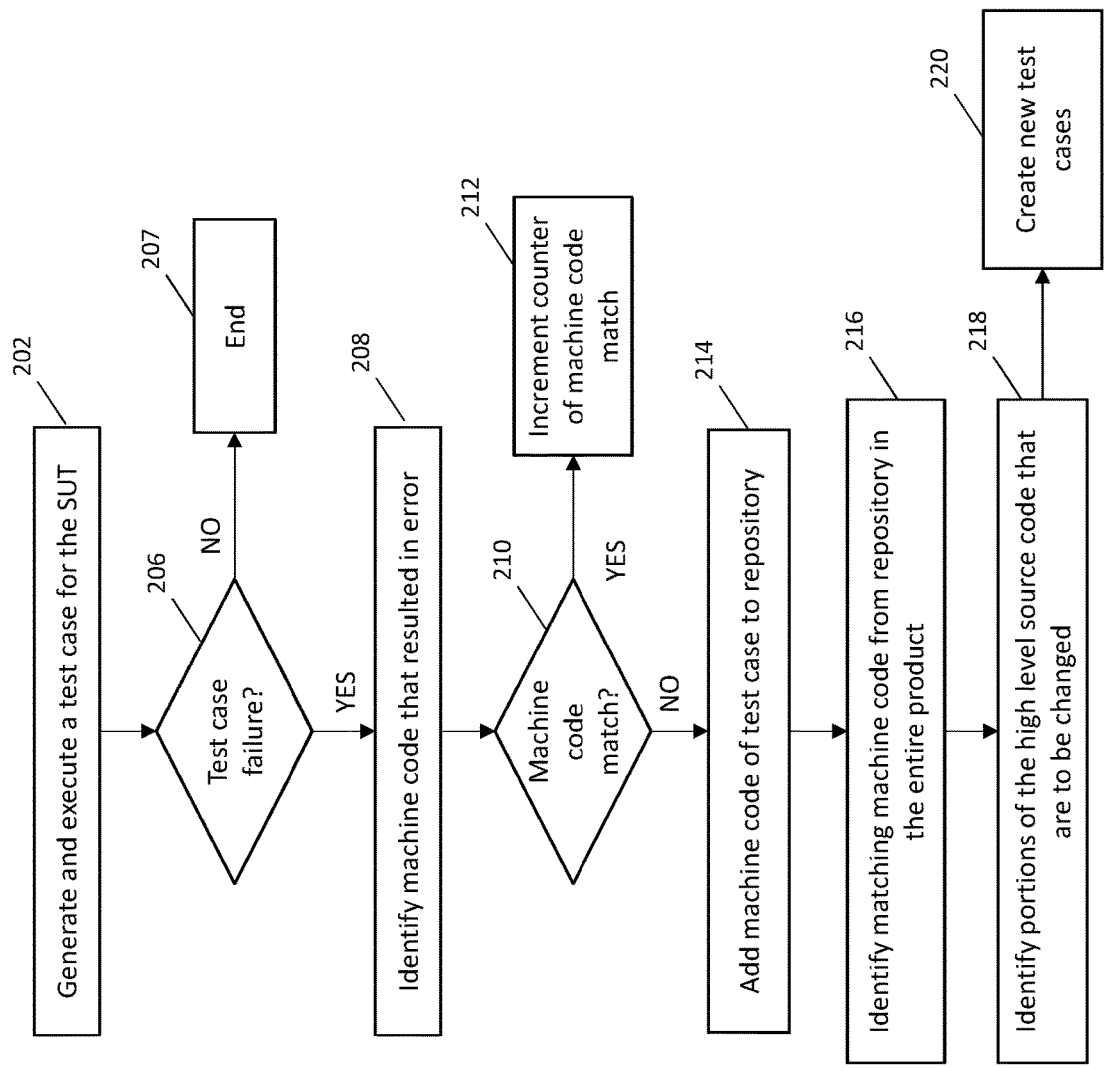
FIG. 2 is a process flow diagram of an illustrative method for machine code analysis in accordance with one or more example embodiments of the invention.

FIG. 2 is a process flow diagram of an illustrative method for machine code analysis in accordance with one or more example embodiments of the invention. At block 202 of the depicted method 200, the testing system 120 generates a set of test cases, such as regression tests, to run on the SUT 110. The testing system 110 further executes the set of test cases and monitors the results on the SUT 110, at block 202. In one or more embodiments of the present invention, the testing system 120 may retrieve the test cases from one or more data stores.

The testing system 120 monitors the execution of the tests. If the execution monitoring detects any errors based on the obtained execution results (decision block 206, "Yes" branch), the testing system 110 identifies a portion of the machine code associated with the detected error, at block 208. In one embodiment, the execution monitor 118 may perform source code analysis to identify, for example, a fault source code path executed by a corresponding regression test that resulted in the error. The sequence in which statements are performed often depends on particular values associated with particular variables. As part of this analysis, the testing system 120 may determine under what specific circumstances program control flows through the fault code path. In one or more embodiments of the present invention, the testing system 120 may determine the last decision branch that was taken to drive the fault code path. Responsive to a negative determination at block 206 ("No" branch), the method 200 may end because none of the executed test cases have failed, at block 207.

The method 200 further includes comparing the identified machine code 108 associated with the failing test case with known machine code 108 with errors, at block 210. For example, the testing system 120 can have a repository of code snippets that have a known pattern of errors. The pattern of errors can include a specific sequence of instructions, use of a particular resource/instruction that the hardware architecture does not support, and the like. The pattern of errors can also include a specific pattern of instructions, such as a first type of instruction followed by a second type of instruction within a predetermined window. The predetermined window can be specified by a number of instructions between the first type of instruction and the second type of instruction. Alternatively, or in addition, the predetermined window can be indicated by a time expended by the SUT between execution of the first type of instruction and execution of the second type of instruction. For example, the first type of instruction can be sharing a resource key and the second type of instruction can be storing the resource key. It is understood that any other type of instructions can be used in the pattern in one or more embodiments of the present invention.

Accordingly, in one or more embodiments of the present invention, determining a match between the machine code 108 includes comparing the machine code to determine an exact match of the instructions being used. Alternatively, or in addition, a comparison of a pattern of the instructions is used to determine the match. For example, a first code snippet and a second code snippet are deemed to match in this case-First Snippet: LOAD REG A, REG B; STORE REG A, REG C; MUL REG A, REG D; STORE REG B, REG A; and Second Snippet: LOAD REG D, REG B; STORE REG D, REG C; MUL REG D, REG A; STORE REG B, REG D. As can be noted, in both these snippets, the pattern of the instructions is the same, with the parameters (in this case the registers) used being different. It is understood that other such example scenarios are possible in one or more embodiments of the present invention.

If the machine code match is found, a counter tracking a number of times the substantially similar machine code has failed is incremented, at block 212. If the machine code match is not found, the machine code is added to a repository by the testing system 120, at block 214. In one or more examples, adding the machine code of the test case to the repository includes parsing the machine code and storing the machine code in the form of a pattern. Storing the machine code in the form of a pattern can include replacing one or more parameters in the machine code with generic markers. For example, in the above example first snippet, REG A is replaced with a symbol 'X' (or any other symbol that indicates a place holder). In one or more examples, the machine code analyzer 122 performs such operations.

Alternatively, or in addition, the testing system 120 sends information related to the identified machine code snippet to the machine learning engine 124. In one embodiment, the machine learning engine 124 may employ two models for recognizing, analyzing, and learning software program behaviors; namely, a semantic model and a cognitive model. Based on data provided by the machine code analyzer 122, the semantic model may generate semantic descriptions (representations) of data flow and control flow within the analyzed machine code portions including, for example, identified logical constructs. In other words, the semantic model labels data with semantic meaning as to what is observed in the particular portion of a machine code. In turn, the cognitive model may be configured to observe patterns associated with a given machine code portion; update a pattern (i.e., a memory) representing a given machine code portion (e.g., a particular sequence of instructions, a particular logical construct, etc.); reinforcing long-term memories associated with a machine code portion; develop "memories" representing new patterns of program behavior; create new semantic labeling to apply to new patterns of program behavior. In one or more embodiments of the present invention, new patterns of program behavior may be generated as a combination of known patterns. In such a case, the semantic labeling applied to a new program behavior may represent a combination of the labels applied to patterns in that new behavior.

According to an embodiment of the present invention, machine learning engine 124 may employ a pattern matching static code analysis to identify one or more patterns within the analyzed portion of the machine code. In pattern matching, the machine learning engine 124 creates an abstraction of the machine code, such as a control flow graph ("CFG")—a graphic notation representation of all paths that might be traversed through a program during its execution. In one embodiment, the identified one or more patterns may include a sequence of machine code instructions.

According to yet another embodiment, the machine learning engine 124 may employ any known or later developed deep learning techniques. Deep learning is a type of machine learning that attempts to model high-level abstractions in data by using multiple processing layers or multiple non-linear transformations. Deep learning uses representations of data, typically in vector format, where each datum corresponds to an observation with a known outcome. By processing over many observations with known outcomes, deep learning allows for a model to be developed that can be applied to a new observation for which the outcome is not known. For example, in one embodiment, the deep learning technique employed by the machine learning engine 124 may classify a plurality of logical paths within the portion of the machine code.

Some deep learning techniques are based on interpretations of information processing and communication patterns within nervous systems. One example is an artificial neural network. Artificial neural networks are a family of deep learning models based on biological neural networks. They are used to estimate functions that depend on a large number of inputs where the inputs are unknown. In a classic presentation, artificial neural networks are a system of interconnected nodes, called "neurons," that exchange messages via connections, called "synapses" between the neurons.

An example, classic artificial neural network system can be represented in three layers: the input layer, the hidden layer, and the output layer. Each layer contains a set of neurons. Each neuron of the input layer is connected via numerically weighted synapses to nodes of the hidden layer, and each neuron of the hidden layer is connected to the neurons of the output layer by weighted synapses. Each neuron has an associated activation function that specifies whether the neuron is activated based on the stimulation it receives from its inputs synapses.

An artificial neural network is trained using examples. During training, a data set of known inputs with known outputs is collected. The inputs are applied to the input layer of the network. Based on some combination of the value of the activation function for each input neuron, the sum of the weights of synapses connecting input neurons to neurons in the hidden layer, and the activation function of the neurons in the hidden layer, some neurons in the hidden layer will activate. This, in turn, will activate some of the neurons in the output layer based on the weight of synapses connecting the hidden layer neurons to the output neurons and the activation functions of the output neurons. The activation of the output neurons is the output of the network, and this output is typically represented as a vector. Learning occurs by comparing the output generated by the network for a given input to that input's known output. Using the difference between the output produced by the network and the expected output, the weights of synapses are modified starting from the output side of the network and working toward the input side of the network. Once the difference between the output produced by the network is sufficiently close to the expected output (defined by the cost function of the network), the network is said to be trained to solve a particular problem. While the example explains the concept of artificial neural networks using one hidden layer, many artificial neural networks include several hidden layers.

While there are many artificial neural network models, some embodiments disclosed herein use a recurrent neural network. In an artificial neural network, the inputs are independent of previous inputs, and each training cycle does not have memory of previous cycles. The problem with this approach is that it removes the context of an input (e.g., the inputs before it) from training, which is not advantageous for inputs modeling sequences, such as sentences or statements. Recurrent neural networks, however, consider current input and the output from a previous input, resulting in the recurrent neural network having a "memory" which captures information regarding the previous inputs in a sequence.

Referring back to FIG. 2, at block 214, the testing system 120 may verify the determined pattern represents a real defect. It should be noted that current static code analysis techniques generate a high number of false positives. A false positive is when a portion of the source code or machine code is identified as a defect, but it is not actually a defect. False positives create many problems for developers. First, false positives introduce waste of man-hours and computational resources in software development as time, equipment, and money must be allocated toward addressing false positives. Second, a typical software development project has a backlog of defects to fix and retest, and often not every defect is addressed due to time or budget constraints. False positives further exacerbate this problem by introducing entries into the defect report that are not really defects. Once it is verified that the determined pattern represents a real defect, the machine code snippet that is identified is stored by the testing system 120.

Further, the method 200 includes determining if the machine code snippet, and/or that pattern exists anywhere else in the machine code 108 of the software product, at block 216. In one or more examples, the testing system 120 uses machine learning techniques, such as neural network(s), to identify other portions of the machine code 108 that match the machine code snippet of the test case that failed. For example, the testing system 120 scans the entire machine code 108 to determine portions that match the machine code snippet that was identified.

For example, the testing system 120 scans the entire machine code 108 corresponding to the executed set of test cases to find the pattern of the machine code snippet that is identified. In one or more embodiments of the present invention, the machine learning engine 124 compares the created abstraction of the machine code to machine code abstraction patterns associated with one or more defects. When there is a match, the corresponding machine code for the abstraction is flagged as a defect. Pattern matching can also include a statistical component that can be customized based on the best practices of a particular organization or application domain. For example, the machine learning engine 124 may identify that for a particular operation, the machine code 108 performing the operation has a corresponding abstraction 75% of the time. If the machine learning engine 124 encounters the same operation in machine code it is analyzing, but the abstraction for the machine code performing the operation does not match the 75% case, the machine learning engine 124 flags the machine code as a defect. In another exemplary embodiment the machine learning engine 124 may employ a recurrent neural network to find patterns associated with the fault machine code path or construct within the entire machine code 108.

In one or more embodiments of the present invention, the machine learning engine 124 may mark information related to the determined patterns. The testing system 120 may process this pattern information and may use decompiler to find specific lines within the source code 102 that are causing one or more software defects. In one or more examples, if the high level programs 102 include programs in different programming languages, different decompilers are be used. For example, a decompiler of the first programming language identifies a first set of lines in a first program using, and a decompiler of the second programming language identifies a second set of lines in the second program.

In one embodiment, the testing system 120 may generate a confidence value indicating a confidence level of the identified pattern causing the one or more test cases to fail to successfully execute based on the aforementioned statistical component.

In one or more examples, the testing system 120 also determines if the portions of the machine code 108 are going to be exercised by any other test case that is generated by the testing system 120. For example, consider that a first test case fails and the machine code snippet that caused the first test case to fail is corresponding to first portion of the high level programs 102. Further consider another, i.e., a second, portion of the high level programs 102 is corresponding to a matching machine code snippet. In this case, the testing system 120 can mark the second test case to prevent the second test case from executing. The testing system 120 can identify the second test case to the developers providing an option to execute that test case manually, if so desired. By preventing execution of the second test case in this manner, the testing system can reduce the resources required to execute that test case, which was known to be failing test case. Further, time required for completing execution of the generated test cases can be reduced in this manner letting the developer complete the testing sooner.

The method 200 further includes identifying, to the developers one or more portions of the high level programs 102 corresponding to the machine code snippet(s) that cause the test cases to fail, at block 218. In one or more examples, particular line numbers, file names, and other such identification information can be provided so that the developers can precisely know what portions of the high level program 102 are to be changed. In one or more examples, the portions of the high level programs 102 can be marked in a user interface, such as, by highlighting, color, shading, or any other such user interface gestures.

In example embodiments, at block 220, once lines of source code corresponding to one or more portions of the machine code flagged as defects are identified, they are used to generate a corresponding set of test cases. For instance, the set of identified machine code patterns, corresponding statistical information and/or corresponding source code lines may be provided as input to a test case generation tool configured to generate a respective corresponding test case for each identified machine code pattern. Each test case may be designed to test the source code and/or the particular combination of attributes corresponding to the identified machine code pattern.

Advantageously, various techniques contemplated by embodiments of the present invention enable software developers to automatically uncover errors typically missed by unit testing, system testing, quality assurance, and manual code reviews. Such errors may be uncovered in various programs developed using different programming languages and on different platforms. By quickly finding and fixing these hard-to-find defects at the earliest stage in the software development life cycle, organizations are saving millions of dollars in associated costs. Since machine code analysis aims to identify potential defects more accurately than black-box testing, it is especially beneficial in safety-critical computer systems such as those in the medical, nuclear energy, defense, and aviation industries.

Figure 3:
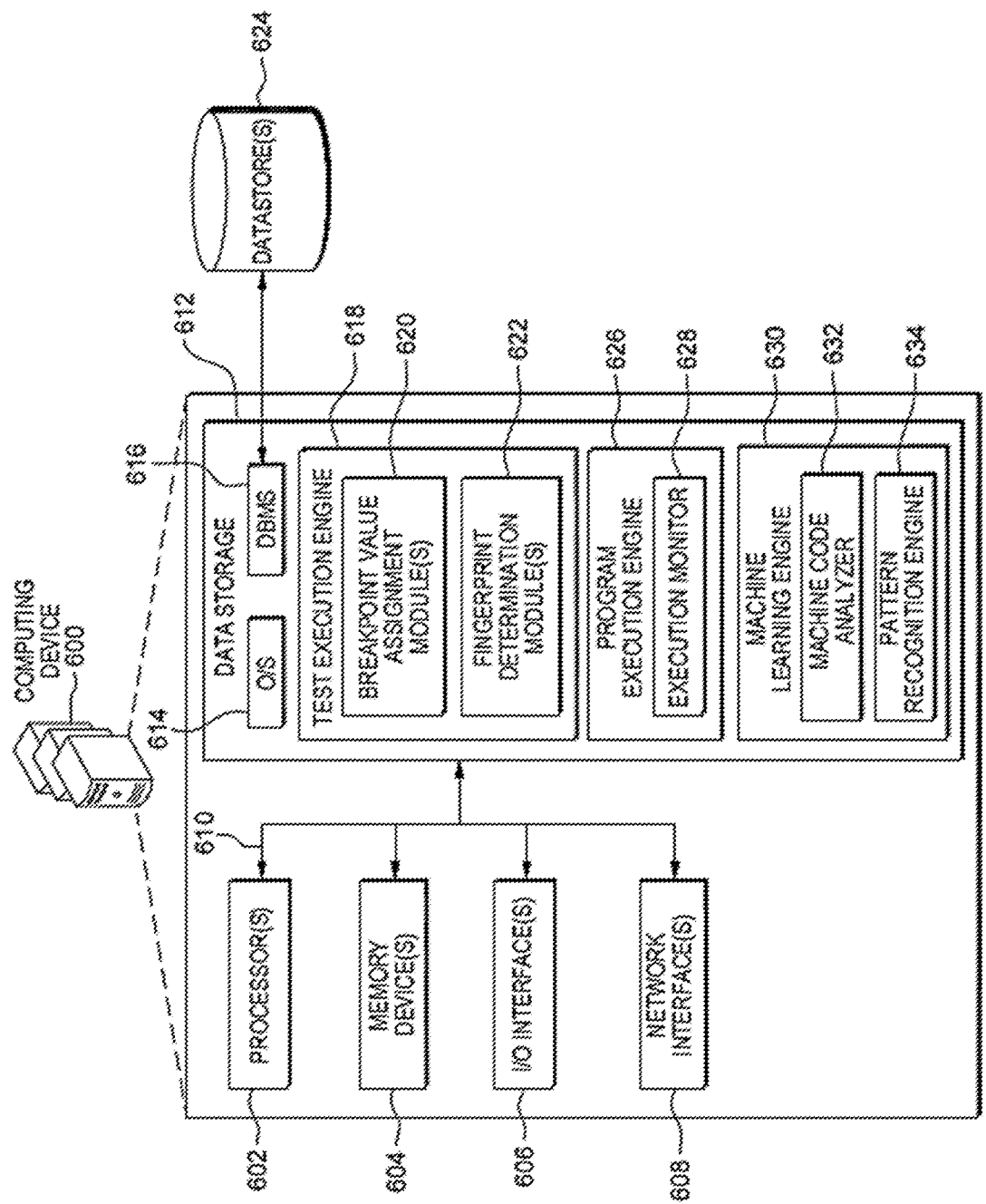
FIG. 3 is a schematic diagram of an illustrative computing device configured to implement one or more example embodiments of the invention.

FIG. 3 is a schematic diagram of an illustrative computing device 600 configured to implement one or more example embodiments of the invention. The illustrative computing device 600 may include a server or collection of servers; a personal computer; a handheld device; or the like. While the computing device 600 and/or any particular component of the computing device 600 may be described herein in the singular, it should be appreciated that multiple instances of the computing device 600 and/or any component thereof may be provided, and functionality described in connection with the computing device 600 may be distributed across multiple computing devices 600 and/or across multiple instances of any particular component of the computing device 600.

In an illustrative configuration, the computing device 600 may include one or more processors (processor(s)) 602, one or more memory devices 604 (generically referred to herein as memory 604), one or more input/output ("I/O") interfaces 606, one or more network interfaces 608, and data storage 612. The computing device 600 may further include one or more buses 610 that functionally couple various components of the computing device 600.

The bus(es) 610 may include at least one of a system bus, a memory bus, an address bus, or a message bus, and may permit the exchange of information (e.g., data (including computer-executable code), signaling, etc.) between various components of the computing device 600. The bus(es) 610 may include, without limitation, a memory bus or a memory controller, a peripheral bus, an accelerated graphics port, and so forth. The bus(es) 610 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random-access memory (SRAM), various types of dynamic random-access memory (DRAM), various types of unalterable ROM, and/or writeable variants of ROM such as electrically erasable programmable read-only memory (EE- PROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 612 may include removable storage and/or non-removable storage including, but not limited to, magnetic storage, optical disk storage, and/or tape storage. The data storage 612 may provide non-volatile storage of computer-executable instructions and other data. The memory 604 and the data storage 612, removable and/or non-removable, are examples of computer-readable storage media (CRSM) as that term is used herein.

The data storage 612 may store computer-executable code, instructions, or the like that may be loadable into the memory 604 and executable by the processor(s) 602 to cause the processor(s) 602 to perform or initiate various operations. The data storage 612 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604 and may ultimately be copied to data storage 612 for non-volatile storage.

More specifically, the data storage 612 may store one or more operating systems (O/S) 614; one or more database management systems (DBMS) 616 configured to access the memory 604 and/or one or more external datastores 624; and one or more program modules, applications, engines, managers, computer-executable code, scripts, or the like such as, for example, a test execution engine 618 that may include one or more breakpoint value assignment modules 620 and one or more fingerprint determination modules 622, a program execution engine 626 that may include one or more execution monitor modules 628 and a machine learning engine 630 that may include one or more machine code analyze modules 632 and one or more pattern recognition engines 634. Any of the components depicted as being stored in data storage 612 may include any combination of software, firmware, and/or hardware. The software and/or firmware may include computer-executable instructions (e.g., computer-executable program code) that may be loaded into the memory 604 for execution by one or more of the processor(s) 602 to perform any of the operations described earlier in connection with correspondingly named modules/engines depicted in FIG. 1.

Although not depicted in FIG. 3, the data storage 612 may further store various types of data utilized by components of the computing device 600 (e.g., data stored in the datastore(s) 624). Any data stored in the data storage 612 may be loaded into the memory 604 for use by the processor(s) 602 in executing computer-executable instructions. In addition, any data stored in the data storage 612 may potentially be stored in the external datastore(s) 624 and may be accessed via the DBMS 616 and loaded in the memory 604 for use by the processor(s) 602 in executing computer-executable instructions.

The processor(s) 602 may be configured to access the memory 604 and execute computer-executable instructions loaded therein. For example, the processor(s) 602 may be configured to execute computer-executable instructions of the various program modules, applications, engines, managers, or the like of the computing device 600 to cause or facilitate various operations to be performed in accordance with one or more embodiments of the invention. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 612, the O/S 614 may be loaded from the data storage 612 into the memory 604 and may provide an interface between other application software executing on the computing device 600 and hardware resources of the computing device 600. More specifically, the O/S 614 may include a set of computer-executable instructions for managing hardware resources of the computing device 600 and for providing common services to other application programs. In certain example embodiments, the O/S 614 may include or otherwise control the execution of one or more of the program modules, engines, managers, or the like depicted as being stored in the data storage 612. The O/S 614 may include any operating system now known or which may be developed in the future including, but not limited to, any server operating system, any mainframe operating system, or any other proprietary or non-proprietary operating system.

The DBMS 616 may be loaded into the memory 604 and may support functionality for accessing, retrieving, storing, and/or manipulating data stored in the memory 604, data stored in the data storage 612, and/or data stored in external datastore(s) 624. The DBMS 616 may use any of a variety of database models (e.g., relational model, object model, etc.) and may support any of a variety of query languages. The DBMS 616 may access data represented in one or more data schemas and stored in any suitable data repository. Data stored in the datastore(s) 624 may include, for example, breakpoint values; fingerprints; source code; regression tests; fault code paths; and so forth, any portion of which may alternatively or additionally be stored in the data storage 612. External datastore(s) 624 that may be accessible by the computing device 600 via the DBMS 616 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 600 may further include one or more network interfaces 608 via which the computing device 600 may communicate with any of a variety of other systems, platforms, networks, devices, and so forth. The network interface(s) 608 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 3 as being stored in the data storage 612 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 600 and/or other computing devices may be provided to support functionality provided by the modules depicted in FIG. 3 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 3 may be implemented, at least partially, in hardware and/or firmware across any number of devices.

It should further be appreciated that the computing device 600 may include alternate and/or additional hardware, software, or firmware components beyond those described or depicted without departing from the scope of the invention. More particularly, it should be appreciated that software, firmware, or hardware components depicted as forming part of the computing device 600 are merely illustrative and that some components may not be present or additional components may be provided in various embodiments. While various illustrative modules have been depicted and described as software modules stored in data storage 612, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 500 may be performed by one or more computing devices 600 having the illustrative configuration depicted in FIG. 3, or more specifically, by one or more program modules, engines, applications, or the like executable on such a device. It should be appreciated, however, that such operations may be implemented in connection with numerous other device configurations.

The operations described and depicted in the illustrative method of FIG. 5 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 5 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for machine code analysis, the method comprising:

generating, for a software product comprising a first computer program in a first high level programming language, and a second computer program in a second high level programming language, machine code that is executable by a hardware of a system under test, the machine code comprising a first set of machine-executable instructions corresponding to the first computer program and a second set of machine-executable instructions corresponding to the second computer program;

executing a set of test cases associated with the first computer program, the set of test cases causes execution of the first set of machine-executable instructions;

determining a failing test case, from the set of test cases;

analyzing the first set of machine-executable instructions from the machine code to identify a pattern of machine-executable instructions in the first set of machine-executable instructions causing the failing test case to fail;

identifying, in the machine code of the software product, the pattern of machine-executable instructions to be present in the second set of machine-executable instructions; and responsively, generating one or more test cases to test the second computer program in the second programming language corresponding to the second set of machine-executable instructions having the identified pattern.

2. The method of claim 1, further comprising identifying one or more lines of code in a high level computer program of the software product that are associated with a portion of machine code having the identified pattern.

3. The method of claim 1, further comprising, identifying a first set of lines of code in the first computer program using a decompiler of the first high level programming language, and identifying a second set of lines of code in the second computer program using a decompiler of the second high level programming language.

4. The method of claim 1, wherein analyzing the portion of machine code comprises analyzing machine code using a machine learning model.

5. The method of claim 4, wherein analyzing a portion of the machine code further comprises generating a confidence value indicating a confidence level of the identified pattern causing the one or more test cases to fail to successfully execute.

6. The computer-implemented method of claim 1, further comprising:

identifying a first test case that causes execution of at least one portion of machine code that comprises the pattern of machine machine-executable instructions; and preventing the first test case from executing.

7. A system for machine code analysis, the system comprising:

at least one processor; and at least one memory storing computer-executable instructions, wherein the at least one processor is configured to access the at least one memory and is configured to perform a method comprising:

generating, for a software product comprising a first computer program in a first high level programming language, and a second computer program in a second high level programming language, machine code that is executable by a hardware of a system under test, the machine code comprising a first set of machine-executable instructions corresponding to the first computer program and a second set of machine-executable instructions corresponding to the second computer program;

executing a set of test cases associated with the first computer program, the set of test cases causes execution of the first set of machine-executable instructions;

determining a failing test case, from the set of test cases;

analyzing the first set of machine-executable instructions from the machine code to identify a pattern of machine-executable instructions in the first set of machine-executable instructions causing the failing test case to fail;

identifying, in the machine code of the software product, the pattern of machine-executable instructions to be present in the second set of machine-executable instructions; and responsively, generating one or more test cases to test the second computer program corresponding to the second set of machine-executable instructions having the identified pattern.

8. The system of claim 7, wherein the method further comprises identifying one or more lines of code in a high level computer program of the software product that are associated with a portion of machine code having the identified pattern.

9. The system of claim 7, wherein the method further comprises, identifying a first set of lines of code in the first computer program using a decompiler of the first high level programming language, and identifying a second set of lines of code in the second computer program using a decompiler of the second high level programming language.

10. The system of claim 7, wherein analyzing a portion of machine code comprises analyzing machine code using a machine learning model.

11. The system of claim 10, wherein analyzing the identified portion of the machine code further comprises generating a confidence value indicating a confidence level of the identified pattern causing the one or more test cases to fail to successfully execute.

12. A computer program product for machine code analysis, the computer program product comprising a storage medium readable by a processing circuit, the storage medium storing instructions executable by the processing circuit to cause a method to be performed, the method comprising:

generating, for a software product comprising a first computer program in a first high level programming language, and a second computer program in a second high level programming language, machine code that is executable by a hardware of a system under test, the machine code comprising a first set of machine-executable instructions corresponding to the first computer program and a second set of machine-executable instructions corresponding to the second computer program;

executing a set of test cases associated with the first computer program, the set of test cases causes execution of the first set of machine-executable instructions;

determining a failing test case, from the set of test cases;

analyzing the first set of machine-executable instructions from portion of the machine code to identify a pattern of machine-executable instructions in the first set of machine-executable instructions causing the failing test case to fail;

identifying, in the machine code of the software product, the pattern of machine-executable instructions to be present in the second set of machine-executable instructions; and responsively, generating one or more test cases to test the second computer program corresponding to the second set of machine-executable instructions having the identified pattern.

13. The computer program product of claim 12, wherein the method further comprises identifying one or more lines of code in a high level computer program of the software product that are associated with a portion of machine code having the identified pattern.

14. The computer program product of claim 12, wherein the method further comprises, identifying a first set of lines of code in the first computer program using a decompiler of the first high level programming language, and identifying a second set of lines of code in the second computer program using a decompiler of the second high level programming language.

15. The computer program product of claim 12, wherein analyzing a portion of machine code comprises analyzing machine code using a machine learning model, by generating a confidence value indicating a confidence level of the identified pattern causing the one or more test cases to fail to successfully execute.

\* \* \* \* \*